United States Patent [19]

Lehr

[11] 4,253,702
[45] Mar. 3, 1981

[54] LOCK FOR SAFETY BELTS IN VEHICLES

[75] Inventor: Werner Lehr, Munich, Fed. Rep. of Germany

[73] Assignee: Bayerische Motoren Werke Aktiengesellschaft, Fed. Rep. of Germany

[21] Appl. No.: 32,343

[22] Filed: Apr. 23, 1979

[30] Foreign Application Priority Data

Apr. 29, 1978 [DE] Fed. Rep. of Germany ....... 2819018

[51] Int. Cl.³ .................. A62B 35/00; A47C 31/00
[52] U.S. Cl. ................................ 297/468; 280/801
[58] Field of Search .................. 280/801, 805, 808; 297/483, 468, 485, 470

[56] References Cited

U.S. PATENT DOCUMENTS

| 3,258,293 | 6/1966 | Sharp | 297/483 |
| 3,820,815 | 6/1974 | Noir | 280/801 X |
| 4,129,320 | 12/1978 | Fancy | 297/468 |

FOREIGN PATENT DOCUMENTS

| 1277687 | 9/1968 | Fed. Rep. of Germany . | |
| 2400898 | 7/1975 | Fed. Rep. of Germany . | |
| 2225011 | 10/1974 | France | 280/801 |
| 2336277 | 7/1977 | France | 280/801 |
| 1005044 | 10/1963 | United Kingdom . | |
| 1384386 | 2/1975 | United Kingdom | 280/801 |

*Primary Examiner*—James T. McCall
*Attorney, Agent, or Firm*—Craig & Antonelli

[57] ABSTRACT

A lock for a safety belt in a vehicle such as a passenger car is disclosed. The lock comprises a lock housing and a lock tongue disposed on the safety belt, which lock tongue can be swingably clamped in the lock housing. The lock housing is connected by a swing shaft with a part fixed to the vehicle so that the lock housing can be swung in the direction of load. A positively engaging check element is provided for fixing the lock housing to the part fixed to the vehicle in a position of use for single-hand operation, the check element, beginning at a predetermined load, releasing the lock housing so that it can be swung in the direction of load.

6 Claims, 4 Drawing Figures

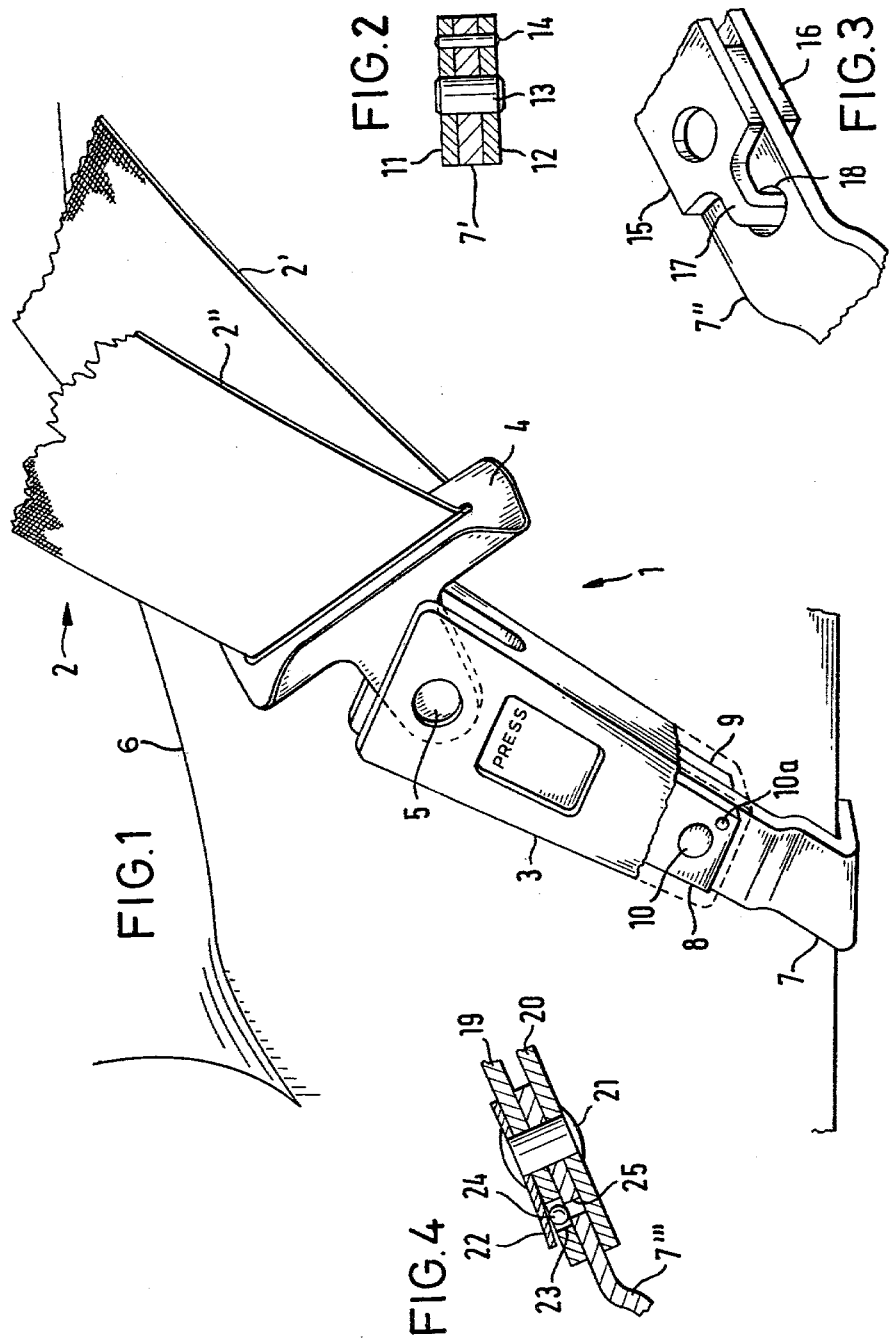

LOCK FOR SAFETY BELTS IN VEHICLES

BACKGROUND AND SUMMARY OF THE INVENTION

The present invention relates to a lock for safety belts in vehicles, especially passenger cars, comprising a lock housing and a lock tongue disposed on the safety belt that can be swingably clamped in the housing, which is connected with a part fixed to the vehicle via a swing shaft so that the housing can be swung back in the direction of load.

A stationary belt lock with swingably clamped lock tongue is known from German AS No. 1,277,687, while a belt lock with swingable section is described in British Pat. No. 1,005,044. Moreover, it is known from German OS No. 2,400,898 that the running of the belt when there is an adjustable seat can be optimized by disposing the lock housing on the seat. Because of the requirement for single-handed operation in fastening or unfastening the belt, the known lock housing is held in a specific position by a bolt arrangement.

To fix the lock housing in its position by frictional engagement is not advantageous. With weak frictional engagement, the lock housing can be swung out of its predetermined position by vehicle jolts or other loads so that it is no longer possible to manipulate it with one hand. With strong frictional engagement on the other hand, the housing can be damaged if the belt is loaded, by a lock tongue engaging it that deviates pronouncedly from the normal direction so that the clamping device automatically releases the tongue, or else the tongue can no longer be released. In either case, the passenger could be considerably endangered.

An object of the present invention is therefore to provide a self-lock of the aforementioned type in which a position-fixation of the belt lock is accomplished in such a way that there is acceptable swinging back of the lock, with elimination of damage to the lock housing in accidental loading of it.

This and other objects of the present invention are attained by providing a lock for a safety belt in a vehicle such as a passenger car comprising a lock housing and a lock tongue disposed on the safety belt, which lock tongue can be swingably clamped in the lock housing, the lock housing being connected by a swing shaft with a part fixed to the vehicle so that the lock housing can be swung in the direction of load, a positively engaging check element being provided for fixing the lock housing to the part fixed to the vehicle in a position of use for single-hand operation, the check element, beginning at a predetermined load, releasing the lock housing so that it can be swung in the direction of load.

An advantage of the present invention resides in that the lock housing can swing back into a position corresponding to the direction of load, from its previous "fixed" position, starting at a specific load, and thereby damage or destruction from bursting of the lock housing is prevented. The predetermined load is of such rated value that damage to the lock housing is prevented and hence the functioning of the belt lock is preserved.

In one form of the present invention the lock housing is swingable about an essentially horizontal swing shaft and the positively engaging check element is a deformable check element. According to one embodiment of the present invention this deformable check element is a shear pin whereas in a second embodiment the deformable check element is formed by an extension of a part of said lock housing which is received in a hole in the part fixed to the vehicle.

In another form of the present invention the lock housing is swingable about an essentially horizontal swing shaft and the positively engaging check element is a locking member such as a ball which is biased in a locking position by a spring member.

These and other objects, features and advantages of the present invention will become more apparent from the following description when taken in connection with the accompanying drawings, which show, for purposes of illustration only, several embodiments in accordance with the present invention.

BRIEF DESCRIPTION OF THE DRAWINGS

FIG. 1 shows schematically the stationary arrangement of a belt lock of the present invention on a vehicle seat, with a latch device that engages the lock housing;

FIG. 2 shows a cross section of the connection between the latch and the lock housing with a shear pin for securing the position;

FIG. 3 shows in perspective another embodiment of the present invention with a connection of latch and lock housing with a tongue that engages in a recess of the latch, for securing the position; and FIG. 4 shows in section still another embodiment of the present invention with a clamping of the lock housing with the latch by means of a spring-loaded ball.

DETAILED DESCRIPTION OF THE DRAWINGS

In FIG. 1, a lock 1 for a safety belt 2 in a passenger car (not illustrated) includes a lock housing 3 and a tongue 4. Tongue 4 is connected with safety belt 2 and can be clamped with lock housing 3 via a cylindrical post 5. For fitting hip strap 2' and shoulder strap 2" of safety belt 2 to the passenger, tongue 4 is swingably clamped in lock housing 3.

As FIG. 1 further shows, lock housing 3 is fixedly disposed on the side of a vehicle seat 6, on its frame, by a rigid latch 7.

Furthermore, lock housing 3 is held in a specific position on vehicle seat 6 or latch 7, so that lock 1 can be operated with one hand. Latch 7 is introduced between lock plates 8,9 of housing 3 and joined by a rivet 10 with lock plates 8,9. A check element 10a, e.g. a pin, in positive engagement fixes lock housing 3 in the position of use, for one-hand operation on latch 7. Check element 10a is so designed that, beginning at a predetermined load deviating from the post 5—rivet 10 direction, it releases housing 3 so that it can swing back. Here advantageously any damage to or destruction of the lock housing is avoided.

Another example is shown in FIG. 2. Here latch 7' is also introduced between lock plates 11,12 of a lock housing. The load here is transmitted from plates 11,12 into latch 7' via a pin 13. Fixing of the position of the lock housing is taken over by a shear pin 14.

In the embodiment according to FIG. 3, lock plates 15, 16 are applied on either side of fastening latch 7", being joined by a rivet, screw or pin to latch 7". For fixing the position of the lock housing, there can be provision of a tongue-like bent extension 17 on lock plate 15, which extension 17 engages in a hole 18 in latch 7". Above a predetermined load the extension 17 is sheared off at hole 18, thus releasing the lock housing so that it can pivot in the direction of load.

In FIG. 4 there is a fastening latch 7''' riveted between plates 19,20 of a lock housing, whereby a rivet 21 supplementarily holds a spring tongue 22. Spring tongue 22 covers a hole 23 in lock plate 19. There is a ball 24 in hole 23 which, from the biasing of spring tongue 22, is applied against the edge of a hole 25 of smaller diameter, in latch 7'''. The lock housing is hereby held in its predetermined position by an elastically yielding locking means.

While we have shown and described only several embodiments in accordance with the present invention, it is understood that the same is not limited thereto but is susceptible of numerous changes and modifications as would be known to those skilled in the art, given the present disclosure, we therefore do not wish to be limited to the details shown and described herein but intend to cover all such changes and modifications as are encompassed by the scope of the appended claims.

I claim:

1. A lock for a safety belt in a vehicle such as a passenger car comprising a lock housing means and a lock tongue means disposed on the safety belt, which lock tongue means can be swingably clamped in said lock housing means, said lock housing means being connected by swing shaft means with a rigid part fixed to the vehicle so that said lock housing means can be swung in the direction of load, a positively engaging check element means being provided for fixing said lock housing means to said rigid part fixed to the vehicle in a position of use for single-hand operation, said check element means, beginning at a predetermined load, releasing the lock housing means from said position so that it can be swung in the direction of load.

2. A lock according to claim 1, wherein said lock housing means is swingable about an essentially horizontal shaft of said swing shaft means and is held in its position for single-hand operation by a deformable check element.

3. A lock according to claim 2, wherein said lock housing means includes at least one lock plate and said part fixed to the vehicle includes a fastening latch, and wherein said swing shaft means is a pin which connects said lock plate and said fastening latch, and wherein the deformable check element is a shear pin.

4. A lock according to claim 2, wherein said lock housing means includes at least one lock plate and said part fixed to the vehicle includes a fastening latch with a hole therein, said lock plate and said latch being connected by said swing shaft means and said deformable check element being formed by an extension of said lock plate that engages in said hole of the fastening latch.

5. A lock according to claim 1, wherein said lock housing means is swingable about an essentially horizontal shaft of said swing shaft means and wherein said check element means includes locking means acted on by elastic means.

6. A lock according to claim 5, wherein said locking means is a ball which penetrates from a hole in said lock housing means into a relatively smaller hole in said part fixed to the vehicle, said elastic means including a spring member which biases said ball into said holes.

* * * * *